US011474510B2

(12) United States Patent
Oestergaard et al.

(10) Patent No.: US 11,474,510 B2
(45) Date of Patent: Oct. 18, 2022

(54) PROGRAMMING A ROBOT BY DEMONSTRATION

(71) Applicant: Universal Robots A/S, Odense S. (DK)

(72) Inventors: Esben H. Oestergaard, Odense S. (DK); Iñigo Iturrate, Odense S. (DK); Thiusius Rajeeth Savarimuthu, Odense SV (DK)

(73) Assignee: UNIVERSAL ROBOTS A/S, Odense S. (DK)

( * ) Notice: Subject to any disclaimer, the term of this patent is extended or adjusted under 35 U.S.C. 154(b) by 339 days.

(21) Appl. No.: 16/087,524

(22) PCT Filed: Apr. 11, 2017

(86) PCT No.: PCT/EP2017/058642
§ 371 (c)(1),
(2) Date: Sep. 21, 2018

(87) PCT Pub. No.: WO2017/178469
PCT Pub. Date: Oct. 19, 2017

(65) Prior Publication Data
US 2019/0086907 A1 Mar. 21, 2019

(30) Foreign Application Priority Data

Apr. 12, 2016 (DK) ............... PA 2016 70220

(51) Int. Cl.
*G05B 19/423* (2006.01)
*B25J 9/16* (2006.01)
*G05B 19/42* (2006.01)

(52) U.S. Cl.
CPC ......... *G05B 19/423* (2013.01); *B25J 9/163* (2013.01); *B25J 9/1615* (2013.01); *B25J 9/1656* (2013.01);
(Continued)

(58) Field of Classification Search
CPC ............... G05B 19/423; G05B 19/42; G05B 2219/36433; G05B 2219/39137;
(Continued)

(56) References Cited

U.S. PATENT DOCUMENTS

| 4,166,543 A | 9/1979 | Dahlstrom |
| 4,398,110 A | 8/1983 | Flinchbaugh et al. |

(Continued)

FOREIGN PATENT DOCUMENTS

| CN | 1200691 A | 12/1998 |
| CN | 103250109 A | 8/2013 |

(Continued)

OTHER PUBLICATIONS

Bennett, D. and Hollerbach, J., Autonomous Calibration of Single-Loop Closed Kinematic Chains Formed by Manipulators with Passive Endpoint Constraints, IEEE Transactions of Robotics and Automation, 7(5):597-606 (1991).

(Continued)

*Primary Examiner* — Nicholas Kiswanto
*Assistant Examiner* — Jamal A Shah
(74) *Attorney, Agent, or Firm* — Burns & Levinson LLP

(57) ABSTRACT

There is provided a method and computer program product for programming a robot by manually operating it in gravity-compensation kinesthetic-guidance mode. More specifically there is provided method and computer program product that uses kinesthetic teaching as a demonstration input modality and does not require the installation or use of any external sensing or data-capturing modules. It requires a single user demonstration to extract a representation of the program, and presents the user with a series of easily-controllable parameters that allow them to modify or constrain the parameters of the extracted program representation of the task.

20 Claims, 3 Drawing Sheets

(52) U.S. Cl.
CPC .......... *B25J 9/1664* (2013.01); *G05B 19/42* (2013.01); *G05B 2219/36433* (2013.01); *G05B 2219/39137* (2013.01)

(58) Field of Classification Search
CPC ........ B25J 9/1615; B25J 9/163; B25J 9/1656; B25J 9/1664; B25J 9/1661; B25J 9/0081; Y10S 901/03; Y10S 901/04
See application file for complete search history.

(56) References Cited

U.S. PATENT DOCUMENTS

| | | |
|---|---|---|
| 4,678,952 A | 7/1987 | Peterson et al. |
| 4,744,039 A | 5/1988 | Suzuki et al. |
| 4,753,569 A | 6/1988 | Pryor |
| 4,817,017 A | 3/1989 | Kato |
| 5,103,941 A | 4/1992 | Vranish |
| 5,155,423 A | 10/1992 | Karlen et al. |
| 5,220,261 A | 6/1993 | Kempas |
| 5,293,107 A | 3/1994 | Akeel |
| 5,341,289 A | 8/1994 | Lee |
| 5,353,386 A | 10/1994 | Kasagami et al. |
| 5,495,410 A | 2/1996 | Graf |
| 5,880,956 A * | 3/1999 | Graf ................. B25J 9/1671 700/86 |
| 6,040,109 A | 3/2000 | Coppens et al. |
| 6,041,274 A | 3/2000 | Onishi et al. |
| 6,070,109 A | 5/2000 | McGee et al. |
| 6,131,296 A | 10/2000 | Fager |
| 6,292,715 B1 | 9/2001 | Rongo |
| 6,408,224 B1 | 6/2002 | Okamoto et al. |
| 6,519,860 B1 | 2/2003 | Bieg et al. |
| 6,535,794 B1 | 3/2003 | Raab |
| 6,704,619 B1 | 3/2004 | Coleman et al. |
| 6,822,412 B1 | 11/2004 | Gan et al. |
| 6,837,892 B2 | 1/2005 | Shoham |
| 6,847,922 B1 | 1/2005 | Wampler, II |
| 6,856,863 B1 | 2/2005 | Sundar |
| 6,922,610 B2 | 7/2005 | Okamoto et al. |
| 6,996,456 B2 | 2/2006 | Cordell et al. |
| 7,248,012 B2 | 7/2007 | Takahashi et al. |
| 7,272,524 B2 | 9/2007 | Brogardh |
| 7,278,222 B2 | 10/2007 | Maier et al. |
| 7,298,385 B2 | 11/2007 | Kazi et al. |
| 7,300,240 B2 | 11/2007 | Brogardh |
| 7,571,025 B2 | 8/2009 | Bischoff |
| 7,643,907 B2 | 1/2010 | Fuhlbrigge et al. |
| 7,756,608 B2 | 7/2010 | Brogardh |
| 8,002,716 B2 | 8/2011 | Jacobsen et al. |
| 8,050,797 B2 | 11/2011 | Lapham |
| 8,160,205 B2 | 4/2012 | Saracen et al. |
| 8,255,462 B2 | 8/2012 | Kondo |
| 8,301,421 B2 | 10/2012 | Bacon et al. |
| 8,340,820 B2 | 12/2012 | Nair |
| 8,410,732 B2 | 4/2013 | Kassow et al. |
| 8,457,786 B2 | 6/2013 | Andersson |
| 8,571,706 B2 | 10/2013 | Zhang et al. |
| 8,571,711 B2 | 10/2013 | Jacobsen et al. |
| 8,571,714 B2 * | 10/2013 | Gienger .................. G05B 19/42 700/258 |
| 8,614,559 B2 | 12/2013 | Kassow et al. |
| 8,756,973 B2 | 6/2014 | Wallace et al. |
| 8,774,965 B2 | 7/2014 | Weiss et al. |
| 8,779,715 B2 | 7/2014 | Kassow et al. |
| 8,812,155 B2 | 8/2014 | Brethe |
| 9,248,573 B2 | 2/2016 | Soe-Knudsen et al. |
| 9,919,416 B1 * | 3/2018 | Bingham ............. B25J 9/0081 |
| 9,919,422 B1 * | 3/2018 | Horton ................ G05B 19/423 |
| 2002/0013675 A1 | 1/2002 | Knoll et al. |
| 2003/0120391 A1 | 6/2003 | Saito |
| 2004/0078114 A1 | 4/2004 | Cordell et al. |
| 2004/0172164 A1 | 9/2004 | Habibi et al. |
| 2004/0189631 A1 | 9/2004 | Kazi et al. |
| 2004/0212626 A1 | 10/2004 | Lyxzen et al. |
| 2005/0080515 A1 | 4/2005 | Watanabe et al. |
| 2005/0222714 A1 | 10/2005 | Nihei et al. |
| 2005/0267637 A1 | 12/2005 | Lapham |
| 2005/0273198 A1 | 12/2005 | Bischoff |
| 2006/0069466 A1 | 3/2006 | Kato et al. |
| 2006/0125806 A1 | 6/2006 | Voyles et al. |
| 2006/0163939 A1 | 7/2006 | Kuramochi et al. |
| 2006/0178775 A1 | 8/2006 | Zhang et al. |
| 2008/0004632 A1 | 1/2008 | Sutherland et al. |
| 2008/0140258 A1 | 6/2008 | Ueno et al. |
| 2008/0188983 A1 | 8/2008 | Ban et al. |
| 2008/0188986 A1 | 8/2008 | Hoppe |
| 2008/0319557 A1 | 12/2008 | Summers et al. |
| 2009/0076655 A1 | 3/2009 | Blondel et al. |
| 2009/0157226 A1 | 6/2009 | de Smet |
| 2009/0259337 A1 | 10/2009 | Harrold et al. |
| 2009/0289591 A1 | 11/2009 | Kassow et al. |
| 2010/0241270 A1 | 9/2010 | Eliuk et al. |
| 2011/0022216 A1 | 1/2011 | Andersson |
| 2011/0288667 A1 * | 11/2011 | Noda ..................... G05B 19/42 700/98 |
| 2012/0210817 A1 | 8/2012 | Kassow et al. |
| 2013/0079928 A1 | 3/2013 | Soe-Knudsen et al. |
| 2013/0231778 A1 | 9/2013 | Ostergaard |
| 2013/0245824 A1 | 9/2013 | Barajas et al. |
| 2013/0255426 A1 | 10/2013 | Kassow et al. |
| 2014/0277737 A1 | 9/2014 | Sekiyama et al. |
| 2015/0217445 A1 | 8/2015 | Hietmann et al. |
| 2015/0336268 A1 | 11/2015 | Payton et al. |
| 2016/0052128 A1 | 2/2016 | Zimmermann et al. |
| 2016/0243704 A1 * | 8/2016 | Vakanski ............... B25J 9/1697 |

FOREIGN PATENT DOCUMENTS

| | | |
|---|---|---|
| DE | 2735632 C2 | 9/1983 |
| DE | 19858154 A1 | 6/2000 |
| DE | 10048096 A1 | 4/2002 |
| DE | 10157174 A1 | 6/2003 |
| DE | 10239694 A1 | 3/2004 |
| DE | 102006061752 A1 | 7/2008 |
| DE | 102008027008 A1 | 12/2009 |
| EP | 1145804 A1 | 10/2001 |
| EP | 1505464 A2 | 2/2005 |
| EP | 1696289 A1 | 8/2006 |
| EP | 1724676 A1 | 11/2006 |
| EP | 2258521 A1 | 12/2010 |
| EP | 2453325 A1 | 5/2012 |
| EP | 2641136 A1 | 9/2013 |
| EP | 3015932 A1 | 5/2016 |
| ES | 2548037 T3 | 10/2015 |
| FR | 2435329 A1 | 4/1980 |
| JP | S60163108 A | 8/1985 |
| JP | H01-146645 A | 6/1989 |
| JP | H02-250782 A | 10/1990 |
| JP | H06-190753 A | 7/1994 |
| JP | H10-254527 A | 9/1998 |
| JP | 2001-050741 A | 2/2001 |
| JP | 2002-120174 A | 4/2002 |
| JP | 2004-49731 A | 2/2004 |
| JP | 2004-148466 A | 5/2004 |
| JP | 2004316722 A | 11/2004 |
| JP | 2005-148789 A | 6/2005 |
| JP | 2005-342885 A | 12/2005 |
| MX | 2013005425 A | 8/2013 |
| RU | 2013125348 A | 12/2014 |
| TW | 200602829 A | 1/2006 |
| TW | M461525 U | 9/2013 |
| WO | WO-97/00454 A1 | 1/1997 |
| WO | WO-2004/071717 A1 | 8/2004 |
| WO | WO-2007/099511 A2 | 9/2007 |
| WO | WO-2009/107358 A1 | 9/2009 |
| WO | WO-2012/066025 A1 | 5/2012 |
| WO | 2015135070 A1 | 9/2015 |

OTHER PUBLICATIONS

Communication pursuant to Article 94(3) EPC for EP15176362, 4 pages (dated Jan. 5, 2017).

(56) References Cited

OTHER PUBLICATIONS

Communication pursuant to Article 94(3) EPC for EP151763623.0, 5 pages (dated Aug. 13, 2018).
Espacenet, Patent Search, Family List: EP2641136, 2 pages (retrieved Jun. 5, 2017).
File History for CN201180054670, 70 pages (retrieved Jun. 5, 2017).
File History for EP2453325 48 pages (retrieved Jun. 5, 2017).
File History for EP2641136, 1116 pages, counterpart to U.S. Appl. No. 13/885,233 (retrieved Jun. 5, 2017).
File History for EP3015932, 93 pages (retrieved Jun. 5, 2017).
Flange, Merriam-Webster definition, 11 pages (retrieved Jun. 7, 2017). URL: http://www.merriamwebster.com/dictionary/flange.
International Preliminary Report on Patentability for PCT/EP2011/070228, 26 pages (dated Feb. 27, 2013).
International Search Report for PCT/EP2011/070228, 3 pages (dated Apr. 24, 2012).
International Search Report for PCT/EP2017/058642, issued by ISA/EP, 5 pages (dated Aug. 18, 2017).
KUKA System Software (KSS), KR C21 KR C3, Expert Programming, Release 5.2, Version 00, 183 pages (Issued Sep. 26, 2003).
Maier, C., Aufbau und Einsatz von Industrierobotern, Design and Use of Industrial Robots, Lecture Notes, 3rd Edition, Institute for Production Technology, 11 pages (1996). [English translation unavailable].
Opposition against European Patent EP 2641136 B1, 27 pages (Jul. 22, 2015).
Robot, Dictionary.com definition, 5 pages (retrieved Jun. 7, 2017). URL: http://www.dictionary.com/browse/robot?s=t,%2520pages%25201-5).
Summons to attend oral proceedings pursuant to Rule 115(1) EPC for EP11784999, 8 pages (Dec. 1, 2016).
Written Opinion for PCT/EP2017/058642, issued by ISA/EP, 11 pages (dated Aug. 18, 2017).
Written Opinion of the International Preliminary Examining Authority for PCT/EP2011/070228, 3 pages (dated Oct. 17, 2012).
Written Opinion of the International Searching Authority for PCT/EP2011/070228, 7 pages (dated Apr. 25, 2012).
Office Action for Taiwan Patent Application No. 106110317, dated Dec. 16, 2020, (10 pages), with English Translation.
Communication pursuant to Article 94(3) EPC for European Patent Application No. 17720690.1, dated Jan. 19, 2021, (9 pages).
First Office Action for Chinese Patent Application No. 201780020196.2, dated May 19, 2021, with English Translation. (8 pages).
Office Action for Taiwan Patent Application No. 106110317, dated Nov. 25, 2021, (13 pages), with English Translation.

\* cited by examiner

PROGRAMMING A ROBOT BY DEMONSTRATION

CROSS-REFERENCE TO RELATED APPLICATION

This application is a national stage entry of PCT Application No. PCT/EP2017/058642. The contents of PCT Application No. PCT/EP2017/058642 are incorporated herein by reference.

FIELD OF THE INVENTION

The present invention relates to robots and more particularly to a method and apparatus for automated robot motion programming.

BACKGROUND OF THE INVENTION

Robotic devices may be used in a variety of applications, such as manufacturing, medical, safety, military, exploration, elder care, healthcare, and/or other applications. Some existing robotic devices (e.g., manufacturing assembly and/or packaging robots) may be programmed in order to perform various desired functions. Some robotic devices (e.g., surgical robots) may be remotely controlled by humans. Some robotic devices may learn to operate via exploration.

Programming robots may be costly and remote control by a human operator may cause delays and/or require high level of dexterity from the operator. Furthermore, changes in the robot model and/or environment may require changes in the programming code. Remote control typically relies on user experience and/or agility that may be inadequate when dynamics of the control system and/or environment (e.g., an unexpected obstacle appears in path of a remotely controlled vehicle) change rapidly.

The automation industry has recently seen a shift from large, dangerous, complex robots to collaborative robots. This new kind of robot is easy to set-up, safe to operate alongside humans and easy to program even by inexperienced users. This has greatly reduced the cost of deploying robots and reduced their payback time, enabling Small and Medium-sized Enterprises to set up robots in their production plants.

These collaborative robots make use of gravity compensation mode and kinesthetic guidance to allow the user to teach in robot via-points by manually moving the robot to the desired Cartesian-space position and recording the point using a Graphical User Interface (GUI), usually located on a teaching pendant.

Although more intuitive than traditional methods using numerical programming, the process can still take a considerable amount of time, especially for more complex movements and larger programs, where the robot has to be sequentially moved through a plurality of points, all while configuring the appropriate actions through the teach pendant or GUI.

Improvements in the prior art for the lead through teaching method include the use of various types of teaching handles (not shown) that aid the operator in guiding the robot through the desired motions. Teaching handles improve the operator's mechanical advantage over the robot, however the operator is still left to manipulate and accurately control the robot through the desired motions while maintaining control in three or more dimensions.

The field of Programming by Demonstration (PbD) provides an alternative to the complexity and time requirements of programming a robot by traditional methods or through the use of a GUI or teach pendant. It aims to simplify programming to where it is intuitive for any end user, regardless of their previous level of experience with robots. It accomplishes this by capturing a user demonstration of the desired outcome of a robot task execution by an assortment of sensing means and then trying to extract a general robot program description of the task from the captured data.

To this end, one of the most popular techniques is that of kinesthetic teaching, whereby the user operates the robot, which is placed in a gravity-compensation mode, by using their own hands. The user then drags the robot through the desired program motions. Other capturing means that have been proposed include vision systems, full-body sensing suits, sensing gloves, magnetic tracking devices or a combination of the aforementioned.

The problems with most PbD approaches, however, is that that they require too many user demonstrations of the same task to be able to extract a usable program representation, that their abstractions are too complex to comprehend—and therefore to control to their liking—for the user, or that they require the user to make use of external hardware solutions, as could be magnetic trackers, gloves, cameras, full-body sensing suits, or any combination of the aforesaid, thus greatly increasing the cost and complexity of deployment of such a solution in a real industrial context.

The offline programming method requires that a computer model is available for the workpiece and an accurate calibration equipment and procedure is available to convert the program data in the simulated setup into the program data in the robot setup. As a result, this method cannot be utilized if the computer model is not available or the calibration accuracy does not suffice to meet the process requirement.

Consequently, there is a need for a method and apparatus that allows the operator to program robot motions with minimum effort in the real setup so that the process requirement and motion path are presented together and the operator can provide in-situ and timely judgment for any particulars in programming the robot. Further, it is desirable that a spatial relationship between the robot and the workpiece is constantly maintained without any burden on the operator. Further, it is also desirable that the robot and the workpiece never collide even for applications where close contact is necessary. Further, it is desirable to free the operator from having to guide the robot in three dimensions for all the program points in a complex path during programming operations in an effort to reduce the complexity of programming desired motions of the robot. Further, simplification of the teaching operation allows for more efficient and automated teaching of robot motions, making frequent programming of programmable robots for small batch jobs economically feasible.

SUMMARY OF THE INVENTION

The present invention provides a significant advance over prior art approaches in that it uses kinesthetic teaching as a demonstration input modality and does not require the installation or use of any external sensing or data-capturing modules. It requires a single user demonstration to extract a representation of the program, and presents the user with a series of easily-controllable parameters that allow them to modify or constrain the parameters of the extracted program representation of the task.

In accordance with a first aspect of the present invention there is provided a method whereby the robot is operated in a demonstration mode to teach the robot to perform a certain process or task. In one embodiment this is achieved by manually operating the robot in gravity-compensation kinesthetic-guidance mode. In such a situation the robot has a double purpose, behaving not only as an actuator, but as a measuring device, whereby the joint positions and velocities are recorded using a sensing device, for instance the robot joint encoders, and other robot operation variables, such as the state of its input/output interface, digital inputs and outputs and other communication signals are recorded directly inside the robot by means of the robot state variable values, or a similar procedure. The robot can also be programmed by operating it through the GUI or other control mechanism, not only manually. Also, it is not necessary for the robot to be in gravity-compensation mode. It could be in force control or some other form of control, or it could also be by operating the break release in the joints and then dragging the robot around. Also, instead of kinesthetic-guidance, it could be another form of control, e.g. teleoperation with a joystick or with the GUI arrows.

In accordance with the present invention the user holds and guides the robot arm throughout the desired motions, while actuating the necessary devices (for instance, opening and closing the gripper, triggering an output, etc.) to accomplish the task. The means for actuating these devices are provided via the robot GUI or other means, for example an actuation button array located on the robot arm.

Specifically, the present invention therefore provides a method of programming a robot for performing a specific process, said method comprising the steps:
providing a robot, such as a robot with a robot arm having sensors for measuring joint positions and velocities in each of its joints, said sensors placed inside the robot and sensing by means of the robot state variable values;
defining a path for movement of the robot, such as by allowing a user to hold the robot arm and guide it throughout the desired path, while actuating associated devices;
monitoring signals from the sensors and recording the operational parameters;
processing the operational parameters to generate a robot control program for applying the process;
optionally configure parameters to control the output program by applying a series of algorithms on the recorded data;
extracting a series of via-points representing the continuous motion demonstrated by the user; and
executing the process thereby generating an imitation of the movements and actions demonstrated by the user.

In a preferred embodiment of the present invention the joint positions and velocities are recorded using sensing devices selected from robot joint encoders, and other robot operation variables, such as the state of its input/output interface, digital inputs and outputs and other communication signals. Also, preferred is that the means for actuating the sensing devices are provided via the robot general (or graphical) user interface (GUI) or other means, such as an actuation button array located on the robot arm.

In a second aspect of the present invention there is provided a computer program product for programming a robot, said robot provided with a robot arm having sensors for measuring joint positions and velocities in each of its joints, said sensors placed inside the robot, said computer program product embodying the method of the present invention thereby registering a path for movement of the robot by allowing a user to hold the robot arm and guide it throughout the desired path.

The robot, as a recording device, records the user demonstration of the task. This action sequence can further be tweaked by the user by means of several configuration parameters, that may adjust, e.g., the precision of the movements, the speed, whether the motion is point-to-point or continuous and whether the program should be simplified to a simpler structural representation, among other possibilities. In a preferred embodiment the invention allows the user to choose whether the recorded sequence of actions should be played back directly. In this case, the robot will simply execute an exact imitation of the movements and actions demonstrated by the user. This allows the user to verify what the robot recorded and modify their demonstration accordingly. This can be accomplished by reading the recorded joint position data and executing a series of movement commands on the robot with the same motion parameters as were recorded.

If not played back directly, the user can, as said, configure several parameters to control the output program. The robot will in this case apply a series of algorithms on the recorded data. Continuous curve simplification methods, or a similar method, are used to extract a series of via-points that best represent the continuous motion demonstrated by the user. Step filters or other similar mechanisms can be used to detect input and output changes. The output is a series of action events, or equivalent abstractions that represent, at a high level, the task taught to the robot.

The action event list described previously can then be internally converted to a robot-specific program format, which can be directly read and executed by the robot. This conversion will be affected by the parameters configured by the user, as previously detailed. The program file can then be played back on the robot. Through observation, the user can then iteratively edit parts of a demonstration—either actions or trajectory segments—by means of the GUI, by performing a partial re-demonstration of the segment to be corrected, or by other means.

In both of the aforementioned instances of use, the robot behaves as an actuating device.

Additionally, the aforementioned procedure can be realized using a simulated robot, in which case this simulated robot is used as both a recording tool and an actuator. In this case, the user will not kinesthetically guide the gravity-compensated robot, but will instead use a GUI or similar input mechanism to simulate the movements of the simulated robot.

In any case, the interaction procedure is equivalent in the case of a simulated robot to that experienced with a physical robot. The user can again choose to play back the recorded demonstration directly or set a plurality of configuration parameters to affect the behavior of the action extraction and subsequent program conversion routine. When the simulated robot is then placed in a simulated actuator mode, the simulated robot will then present a simulated representation of the learned program execution through the GUI, or other appropriate representation means.

The output of the afore stated simulated system is in any case equivalent to the output of the aforesaid physical robot system, namely, a robot program that is executable by the robot in its particular programming language. That is, robot programs are portable between the simulated and physical systems. Moreover, the program can be edited in either of the two systems, saved and then subsequently further edited in the other system.

The claimed invention may also make use of additionally recorded demonstration data to further tune the output robot program. For instance, the velocity information from the recorded user demonstration may be used to tune the precision constraints of the system, in a way that, when the user kinesthetically guides the robot to a location while the robot is in gravity-compensation mode, faster movements will indicate transitional displacements between action points with lower precisional requirements, while slower, more deliberate movements convey that the current robot location or movement is to be executed with tighter precisional constraints. This is achieved by tuning an epsilon parameter in the afore-described continuous-curve simplification algorithm, or any similar implementation, which controls the distance that two trajectory points have to be separated by in order to be added to the list of program via-points. This end could also be achieved through different means.

Furthermore, the system could be complemented with the possibility of using an assortment of Human-Robot Interaction procedures whereby the system queries the user at appropriate times about their intention and about the correctness of the so-far extracted program representation. These queries could include, but are not limited to, whether the task should be generalized to another chosen location, whether the user is attempting to demonstrate any loops or branching structures, or other similar queries.

DETAILED DESCRIPTION OF THE INVENTION

Figure 1:
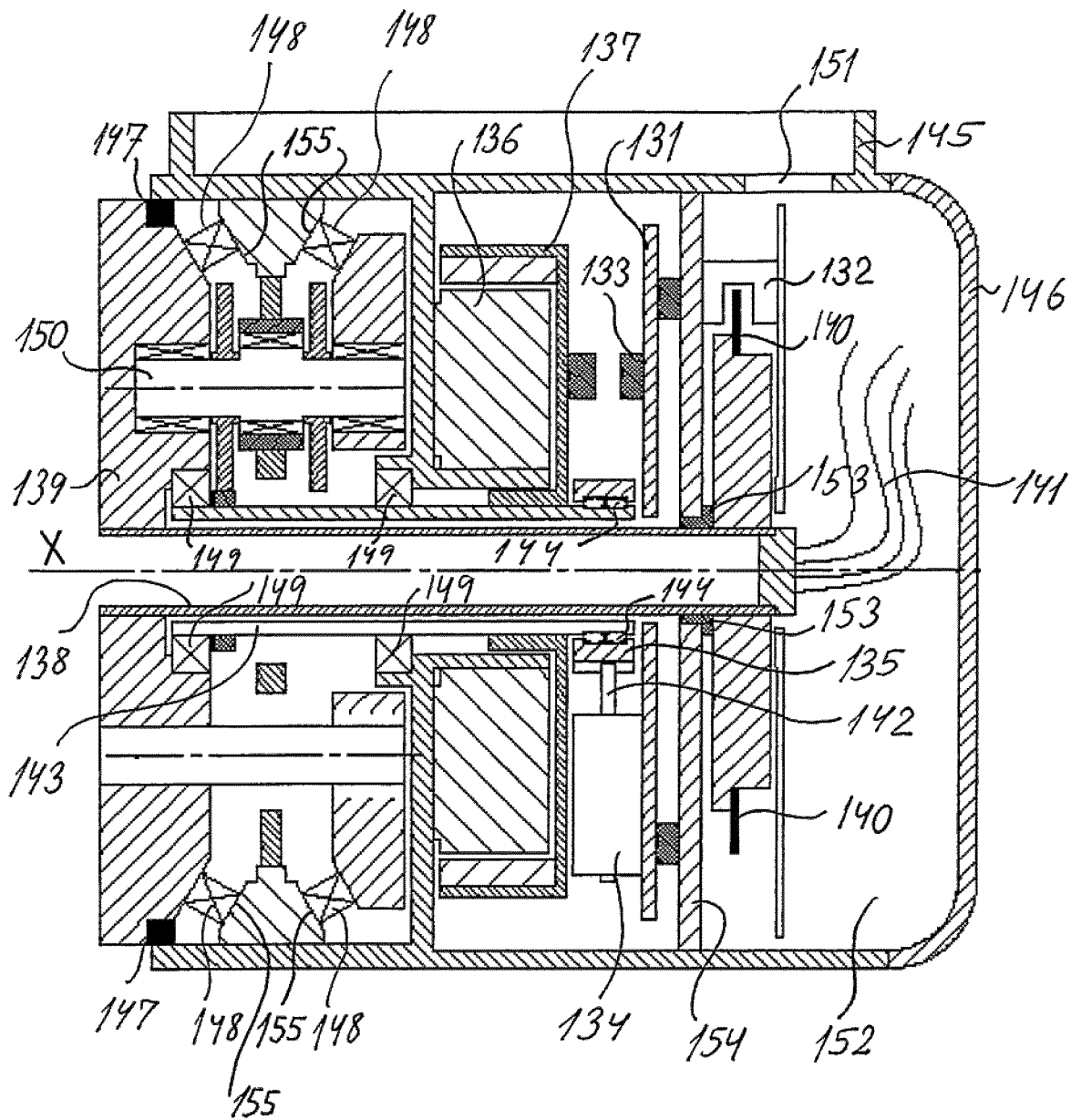
FIG. 1 shows a joint of the robot arm with the sensors for measuring joint positions and velocities in each of its joints to be used in the teaching of the robot.

In the following a part (joint) of robot arm applicable to the present invention is shown. Of particular importance for the teaching method of the present invention are the sensors for measuring joint positions and velocities in each of its joints. These are shown in FIG. 1 as position sensors 132, 133. In this figure there is shown a cross sectional view through a joint according to an embodiment of the invention. The joint comprises mechanical, electro-mechanical, electronic and optical elements that are mutually interconnected, either directly via electrical connectors or via wireless, for instance optical, coupling to other elements. In order to ensure the most simple and straightforward mounting and connection of these elements it is advantageous if as many as possible of these elements are provided on one printed circuit board 131 (PCB). A cross sectional view through an embodiment of a joint, which can be used in six-axis robots, but it is understood that this joint could also be used in connection with other robots. In the shown embodiment a safety brake 134, 135 is implemented is also shown, however, this is not a decisive feature.

The sensor 133 used for determining the position (angular orientation of the axle/rotor) of the motor (angular orientation) is mounted at the rear surface of the PCB 131. The motor shown in FIG. 1 comprises a stator part 136 and a rotor part 137.

The sensor 132 used for determining the angular orientation of the output axle 138 or output flange 139 of the joint is mounted on the front surface of the PCB or in a socket on the front surface of the PCB 131. Preferably a high resolution sensor is used and the short distance between the hollow axle 138 and the sensor is important in order to attain a proper positioning of sensor and encoder disc relative to each other. In order to be able to sense the movement (rotation) of the output flange 139 at the PCB 131 through the joint the encoder disc 140 is mounted on the hollow axle 138 through which electrical and pneumatical connections 141 are guided through the joint and the hollow axle 138 is connected to the output flange 139.

Furthermore, the joint according to this embodiment of the invention is designed such that adjacent joints can be attached to each other without use of further elements. Attachment of the joint to an adjacent joint or connecting member (for instance a thin-walled tube) takes place via the output flange 139 and the connecting portion 145 on the housing 146 of the joint. Apart from this, robot joints according to the invention can be coupled together by suitable members, for instance thin-walled tubes, which constitute a preferred choice due to their optimal rigidity/weight ratio. Furthermore, the joint according to this embodiment of the invention comprises a seal 147 between the housing 146 and the output flange 139, main bearings 148 resting against inclined inner surface portions (bearing surfaces) 155 provided in the housing 146, sealed bearings 149, transmission 150, at least one passage 151 for connections from an adjacent joint or connecting member, an area/space (152) for a slip ring and for twisting wires 141, when the output members 138, 139 rotate, further bearings 153 and a plate 154, for instance of aluminium or other suitable material, for mounting the PCB 131 and also for acting as a heat sink for power electronics in the joint.

Figure 2:
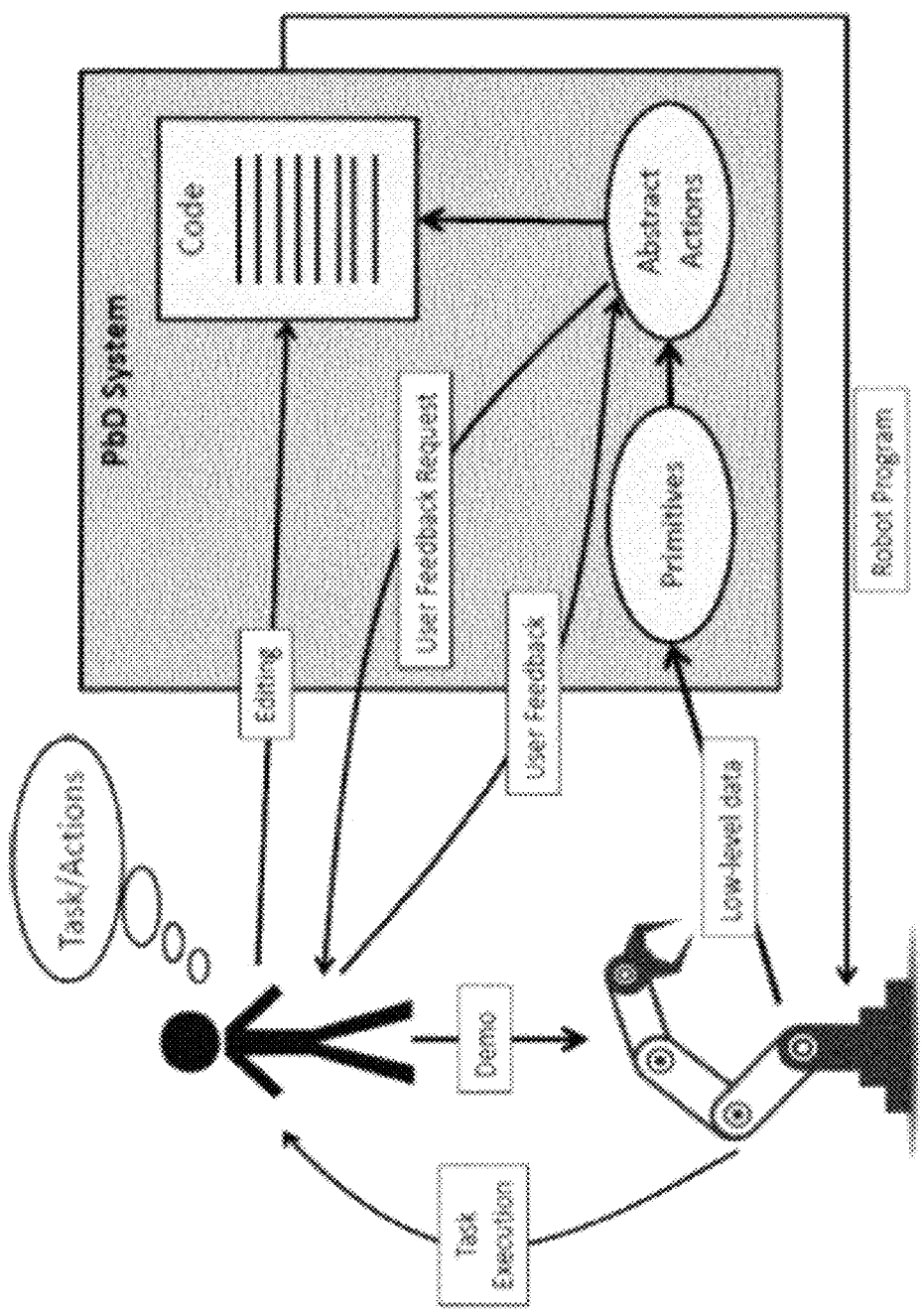
FIG. 2 shows an interaction diagram according to one embodiment of the invention.
Figure 3:
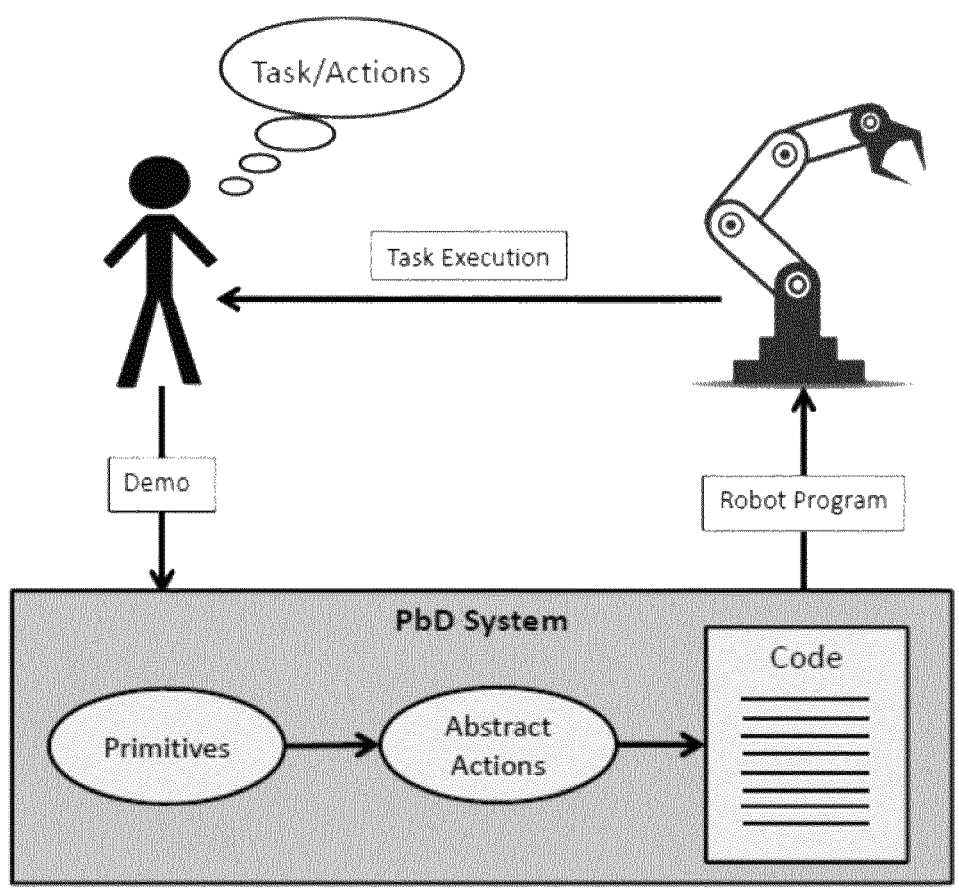
FIG. 3 shows an interaction diagram according to a preferred embodiment of the invention.

Referring to FIGS. 2 and 3 two possible interaction diagrams are shown, while the one shown in FIG. 3 is preferred.

Although many different approaches to Programming by Demonstration (PbD) may be envisaged in accordance with the present invention the inventors have provided two possible approaches in FIGS. 2 and 3. For these particular approaches demonstration is made by a user and the movements of the robot are recorded as a universal program code (UR) based on the extraction of a series of via-points representing the continuous motion demonstrated by the user. In one embodiment of the present invention the robot has a robot arm with sensors for measuring joint positions and velocities in each of its joints in order to monitor the signals from the sensors and record the operational parameters. However, in alternative embodiments robots without robot arms can be utilized. Also, instead of measuring joint positions/velocities, it could also be done in Cartesian/task space or any other frame. The sensors could also be external and not located on the joints, e.g. a vision system or a GPS for a mobile robot.

Subsequently the operational parameters are processed to generate a robot control program for applying the process. In that way the program may generate an imitation of the movements and actions demonstrated by the user.

The invention claimed is:
1. A method of programming a robot, the robot comprising an arm, joints, and sensors for measuring positions of the joints and velocities of the joints, the method comprising:
demonstrating a first path of movement of the robot by manually guiding the arm through at least part of the first path of movement;

monitoring first signals from the sensors to obtain first operational parameters based on the first path of movement;

recording the first operational parameters;

processing the first operational parameters that were recorded to generate a control program for the robot to produce the first path of movement for the robot comprised of movements and actions;

demonstrating an edited path of movement of the robot for a segment of the first path of movement by manually guiding the arm through at least part of the segment of the first path of movement, the edited path of movement comprising the at least part of the segment of the first path of movement having edits to at least some of the movements and actions for the first path of movement;

monitoring second signals from the sensors to obtain second operational parameters based on the edited path of movement;

recording the second operational parameters;

updating the control program based on the second operational parameters that were recorded to produce an updated control program; and executing the updated control program to produce, on the robot, a second path of movement including part of the first path of movement and the edited path of movement.

2. The method of claim 1, wherein the positions and velocities are recorded using the sensors; and
wherein the at least one of the first operational parameters or the second operational parameters comprise one or more of: a state of an input/output interface of the robot, digital inputs and outputs of the robot, or communication signals of the robot.

3. The method of claim 1, wherein the robot comprises means for actuating the sensors via a robot general user interface (GUI), the means for actuating comprising an actuation button array location on the arm of the robot.

4. The method of claim 1, wherein processing the first operational parameters comprises applying a series of algorithms to recorded data.

5. The method of claim 1, wherein manually guiding the arm is performed in gravity-compensation kinesthetic-guidance mode.

6. The method of claim 1, wherein the sensors are inside the robot.

7. The method of claim 1, wherein manually guiding the arm comprises allowing a user to hold an arm of the robot and to guide the arm of the robot while actuating one or more other devices.

8. The method of claim 1, wherein the first operational parameters are processed to generate the control program based on a series of via-points representing continuous motion corresponding to the movements and actions.

9. The method of claim 1, wherein demonstrating the first path of movement comprises guiding the arm through at least part of the first path of movement using a graphical user interface; or
wherein demonstrating the edited path of movement comprises guiding the arm through at least part of the segment of the first path of movement using the graphical user interface.

10. The method of claim 1, wherein demonstrating the first path of movement comprises guiding the arm through at least part of the first path of movement using a control mechanism; or
wherein demonstrating the edited path of movement comprises guiding the arm through at least part of the segment of the first path of movement using the control mechanism.

11. A non-transitory medium storing code for programming a robot, the robot comprising an arm, joints, and sensors for measuring positions of the joints and velocities of the joints, the code for performing operations comprising:

receiving first information based on demonstrating a first path of movement of the robot by manually guiding the arm through least part of the first path of movement;

where receiving the first information comprises monitoring first signals from the sensors to obtain first operational parameters based on the first path of movement, the first operational parameters comprising the first information;

recording the first operational parameters;

processing the first operational parameters that were recorded to generate a control program for the robot to produce the first path of movement for the robot comprised of movements and actions;

receiving second information based on demonstrating an edited path of movement of the robot for a segment of the first path of movement by manually guiding the arm through at least part of the segment of the first path of movement, the edited path of movement comprising the at least part of the segment of the first path of movement having edits to at least some of the movements and action for the first path of movement;

where receiving the second information comprises monitoring second signals from the sensors to obtain second operational parameters based on the edited path of movement, the second operational parameters comprising the second information;

recording the second operational parameters;

updating the control program based on the second operational parameters that were recorded to produce an updated control program; and executing the updated control program to produce, on the robot, a second path of movement including part of the first path of movement and the edited path of movement.

12. The non-transitory medium of claim 11, wherein the positions and velocities are recorded using the sensors; and
wherein the at least one of the first operational parameters or the second operational parameters comprise one or more of: a state of an input/output interface of the robot, digital inputs and outputs of the robot, and or communication signals of the robot.

13. The non-transitory medium of claim 11, wherein the robot comprises means for actuating the sensors via a robot general user interface (GUI), the means for actuating comprising an actuation button array location on an arm of the robot.

14. The non-transitory medium of claim 11, wherein processing the first operational parameters comprises applying a series of algorithms to recorded data.

15. The non-transitory medium of claim 11, wherein the arm is manually guided in gravity-compensation kinesthetic-guidance mode.

16. The non-transitory medium of claim 11, wherein the sensors are inside the robot.

17. The non-transitory medium of claim 11, wherein manually guiding the arm comprises guiding the arm while actuating one or more other devices.

18. The non-transitory medium of claim 11, wherein the first operational parameters are processed to generate the control program based on a series of via-points representing continuous motion corresponding to the movements and actions.

19. The non-transitory medium of claim 11, wherein the first path of movement is demonstrated by guiding the arm through at least part of the first path of movement using a graphical user interface; or
   wherein the edited path of movement is demonstrated by guiding the arm through at least part of the segment of the first path of movement using the graphical user interface.

20. The non-transitory medium of claim 11, wherein the first path of movement is demonstrated by guiding the arm through at least part of the first path of movement using a control mechanism; or
   wherein the edited path of movement is demonstrated by guiding the arm through at least part of the segment of the first path of movement using the control mechanism.

\* \* \* \* \*